(12) United States Patent
Kusachi et al.

(10) Patent No.: US 8,060,698 B2
(45) Date of Patent: Nov. 15, 2011

(54) METHOD AND APPARATUS FOR CONTROLLING DEGRADATION DATA IN CACHE

(75) Inventors: Souta Kusachi, Kawasaki (JP); Kuniki Morita, Kawasaki (JP); Masaki Ukai, Kawasaki (JP); Tomoyuki Okawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 601 days.

(21) Appl. No.: 12/219,080

(22) Filed: Jul. 15, 2008

(65) Prior Publication Data

US 2008/0282037 A1     Nov. 13, 2008

Related U.S. Application Data

(63) Continuation of application No. PCT/JP2006/303589, filed on Feb. 27, 2006.

(51) Int. Cl.
  *G06F 12/00* (2006.01)
  *G06F 12/16* (2006.01)
(52) U.S. Cl. . 711/133; 711/118; 711/159; 711/E12.022; 714/3
(58) Field of Classification Search .......................... None
  See application file for complete search history.

(56) References Cited

U.S. PATENT DOCUMENTS 5,537,621 A * 7/1996 Charlot et al. .................... 714/8

FOREIGN PATENT DOCUMENTS

| JP | 51-137333 | 11/1976 |
|---|---|---|
| JP | 60-101656 | 6/1985 |
| JP | 62-125448 | 6/1987 |
| JP | 62-143148 | 6/1987 |
| JP | 01-298453 | 12/1989 |
| JP | 02-077953 | 3/1990 |
| JP | 2-294751 | 12/1990 |
| JP | 2-302856 | 12/1990 |
| JP | 05-028044 | 2/1993 |
| JP | 6-504865 | 6/1994 |
| JP | 09-237221 | 9/1997 |
| JP | 09-293017 | 11/1997 |
| JP | 11-065926 | 3/1999 |

OTHER PUBLICATIONS

International Search Report mailed Jun. 27, 2006 in connection with the International application No. PCT/JP2006/303589.
Japanese Office Action for corresponding Japanese Application 2008-501571; mailed Apr. 7, 2009.

* cited by examiner

*Primary Examiner* — Reginald Bragdon
*Assistant Examiner* — Eric Loonan
(74) *Attorney, Agent, or Firm* — Fujitsu Patent Center

(57) ABSTRACT

A cache controller controls at least one cache. The cache includes ways including a plurality of blocks that stores therein entry data. A writing unit writes degradation data to a failed block. The degradation data indicates that the failed block is in a degradation state. A reading unit reads entry data from a block. A determining unit determines, if the entry data obtained by the reading unit includes the degradation data, that the block is in the degradation state.

8 Claims, 6 Drawing Sheets

| FLAG | PA | STS | ECC |
|------|----|----|-----|
| 11 | BITS ALL SET TO 1 | BITS ALL SET TO 0 | NO ERROR |

FIG.5

| | FLAG | PA | STS | RESULT OF ECC DETERMINATION | RESULT OF DETERMINATION ABOUT DEGRADATION STATE | ERROR PROCESS |
|---|---|---|---|---|---|---|
| 51 → | 00 | — | — | — | B | — |
| 52 → | 11 | BITS ALL SET TO 1 | BITS ALL SET TO 0 | NO ERROR | A | — |
| 53 → | 11 | BITS ALL SET TO 1 | BITS ALL SET TO 0 | CE | A | — |
| 54 → | 11 | — | — | UE | A | WAY DEGRADATION |
| 55 → | 11 | NOT ALL BITS IN PA ARE SET TO 1 | NOT ALL BITS IN SYS ARE SET TO 0 | NO ERROR/CE | B | FATAL ERROR |
| 56 → | 01/10 | BITS ALL SET TO 1 | BITS ALL SET TO 0 | NO ERROR | A | — |
| 57 → | 01/10 | BITS ALL SET TO 1 | BITS ALL SET TO 0 | CE | A | WAY DEGRADATION |
| 58 → | 01/10 | — | — | UE | — | FATAL ERROR |
| 59 → | 01/10 | NOT ALL BITS IN PA ARE SET TO 1 | NOT ALL BITS IN SYS ARE SET TO 0 | NO ERROR/CE | B | WAY DEGRADATION |

A: BLOCK IS IN DEGRADATION STATE
B: BLOCK IS NOT IN DEGRADATION STATE

METHOD AND APPARATUS FOR CONTROLLING DEGRADATION DATA IN CACHE

CROSS REFERENCE TO RELATED APPLICATIONS

This is a continuing application, filed under 35 U.S.C. §111(a), of International Application PCT/JP2006/303589, filed Feb. 27, 2006, the contents of which are incorporated herein by reference.

BACKGROUND OF THE INVENTION

1. Field of the Invention

The present invention relates to a technology for controlling a cache that includes ways including a plurality of blocks that store therein entry data, and more particularly, to a technology for controlling block degradation.

2. Description of the Related Art

Cache memories are low-capacity and high-speed memories that are widely used to solve problems caused by difference in performance between a processor such as a central processing unit (CPU) and a storage device such as a memory. The cache memory includes a plurality of ways arranged in parallel. Each of the ways includes a plurality of storage units called "block" as many as indices of the cache memory. A group of blocks in different ways having the same index (i.e., blocks within the same cache line) is usually accessed simultaneously.

Tag random access memories (tag RAMs) are used to store therein tags indicative of addresses where cache data, which is stored in the cache memory, is on a main memory actually. Such a tag RAM provides a list of addresses of the cache data for the CPU. The data structure of the tags stored in the tag RAM is same as the above-described data structure using ways and blocks.

Accesses to a specific block, which are the storage unit in the cache memory, may frequently fail due to a memory failure. If such access errors occur, it is necessary to set the specific block that causes the access errors to an unavailable state, i.e., to degrade the specific block, to avoid occurrence of a serious failure.

In one of degradation methods, if the failure occurs in the specific block, the whole way including the specific block is degraded. Although the block that causes the failure can be easily degraded by the degradation method mentioned earlier, all the blocks in the same way cannot be used, which results in decreasing performance of the cache memory. In contrast, Japanese Patent Application Laid-open No. S60-101656 and Japanese Patent Application Laid-open No. H2-302856 disclose technologies for degrading, if a failure has occurred in a specific block, the specific block only.

However, if the technologies disclosed in Japanese Patent Application Laid-open No. S60-101656 and Japanese Patent Application Laid-open No. H2-302856 are used, degradation data indicative of a degradation status is stored corresponding to each one of the failed blocks, which increases an amount of data in the circuit. To be specific, if there are many ways including many blocks, i.e., there are many blocks, a large amount of degradation data is required, as a result of which a larger part of storage circuit is occupied by the degradation data.

For this reason, there are needs for producing a cache controller that degrades not the whole way but the failed block by using a lower amount of the degradation data. Such problem commonly arises in a data processor including the cache memory.

SUMMARY OF THE INVENTION

It is an object of the present invention to at least partially solve the problems in the conventional technology.

According to an aspect of the present invention, there is provided a cache controller that controls at least one cache, wherein the cache includes ways including a plurality of blocks that stores therein entry data. The cache controller includes a writing unit that writes degradation data to a failed block, the degradation data indicative that the failed block is in a degradation state; a reading unit that reads entry data from a block; and a determining unit that determines, if the entry data obtained by the reading unit includes the degradation data, that the block is in the degradation state.

According to another aspect of the present invention, there is provided a cache control method of controlling at least one cache, wherein the cache includes ways including a plurality of blocks that stores therein entry data. The cache control method includes writing degradation data to a failed block, the degradation data indicative that the failed block is in a degradation state; reading entry data from a block; and determining, if the entry data obtained at the reading includes the degradation data, that the block is in the degradation state.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. In a present embodiment of the present invention, a tag-RAM control unit of a system controller (SC) uses a predetermined method to control a plurality of tag RAMs in CPUs. The SC and the CPUs are connected to each other.

Figure 1:
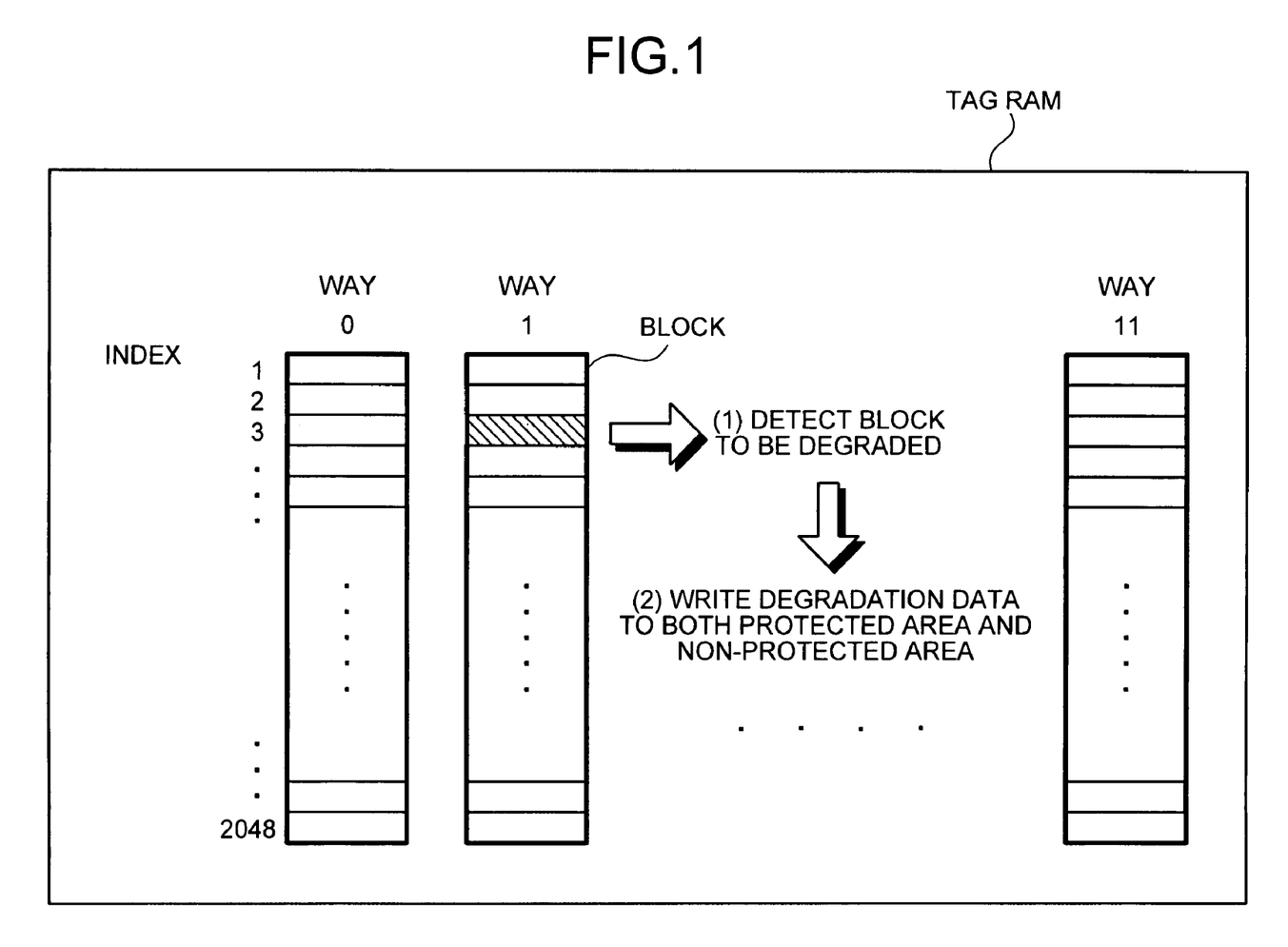
FIG. 1 is a schematic diagram for explaining an overview of a cache control method according to an embodiment of the present invention.

FIG. 1 is a schematic diagram for explaining an overview of a cache control method according to the present embodiment. More particularly, FIG. 1 is a schematic diagram of data structure of a tag RAM. The tag RAM shown in FIG. 1 is for a single CPU. If, for example, there are four CPUs, four sets (for four CPUs) of the tag RAM shown in FIG. 1 are used.

The tag RAM includes total 12 ways from a way 0 to a way 11. Each way includes 2048 blocks. The block is a unit of entry data. The CPU collectively accesses a group of blocks in different ways having the same index, i.e., blocks within the same cache line. For example, if the target index is 3, the CPU simultaneously accesses twelve blocks having the index 3 in each of the ways 0 to 11.

Thus, in the tag RAM that includes a plurality of blocks, due to a failure in a predetermined position inside the tag RAM, an access error frequently occurs at the time of accessing a specific block. If the specific block that causes the access error remains as it is, a serious failure is likely to occur. To avoid occurrence of such a serious failure, it is necessary to degrade the specific block.

If the whole way including the failed block is degraded, degradation data indicating that the block is in a degradation state is stored corresponding to each of the ways. In other words, in the example of FIG. 1, the degradation data is stored corresponding to up to twelve ways. Thus, an amount of data in the circuit such as registers necessary for storing the degradation data is suppressed. However, because the whole way is degraded, not only the failed block but also the normal blocks are not accessible, which decreases the performance of the tag RAM.

On the other hand, if only the failed block is degraded, decrease in the performance can be minimized. However, the degradation data is stored corresponding to each of the failed blocks. In other words, in the example of FIG. 1, the degradation data is stored corresponding to up to 12×2048=24576 blocks. Therefore, there are needs to suppress a total size of the degradation data.

In the cache control method according to the present embodiment, if the failed block that is to be degraded is detected (see (1) of FIG. 1), the degradation data is stored in the failed block as entry data. The degradation data, which indicates that the block is in the degradation state, is written to both a protected area and a non-protected area (see (2) of FIG. 1). Data stored in the protected area is an object for subjecting an error correcting process using an error correcting code (ECC). Data in the protected area includes, for example, a physical address indicative of an address of the data. Data stored in the non-protected area is not an object for subjecting the error correcting process using the ECC.

If the degradation data is written only to the non-protected area, 5-bit degradation data is required to completely correct any read errors including a 2-bit error. However, in the cache control method according to the present embodiment, the degradation data is written to the protected area in addition to the non-protected area. Therefore, a result of determination using the ECC can be used to determine whether the block is in the degradation state. Due to this, a bit rate of the degradation data stored in the non-protected area is suppressed to 2-bit.

If a block is normal, data, for example, the physical address indicative of an address of data and status data indicative of a status of the block when the CPU refers to the block is stored in the protected area. However, if a failure occurs in the block, it is unnecessary to store data such as the physical address or the status data in the protected area. In other words, writing predetermined bits indicating the degradation data to the protected area causes no problems.

Figure 2:
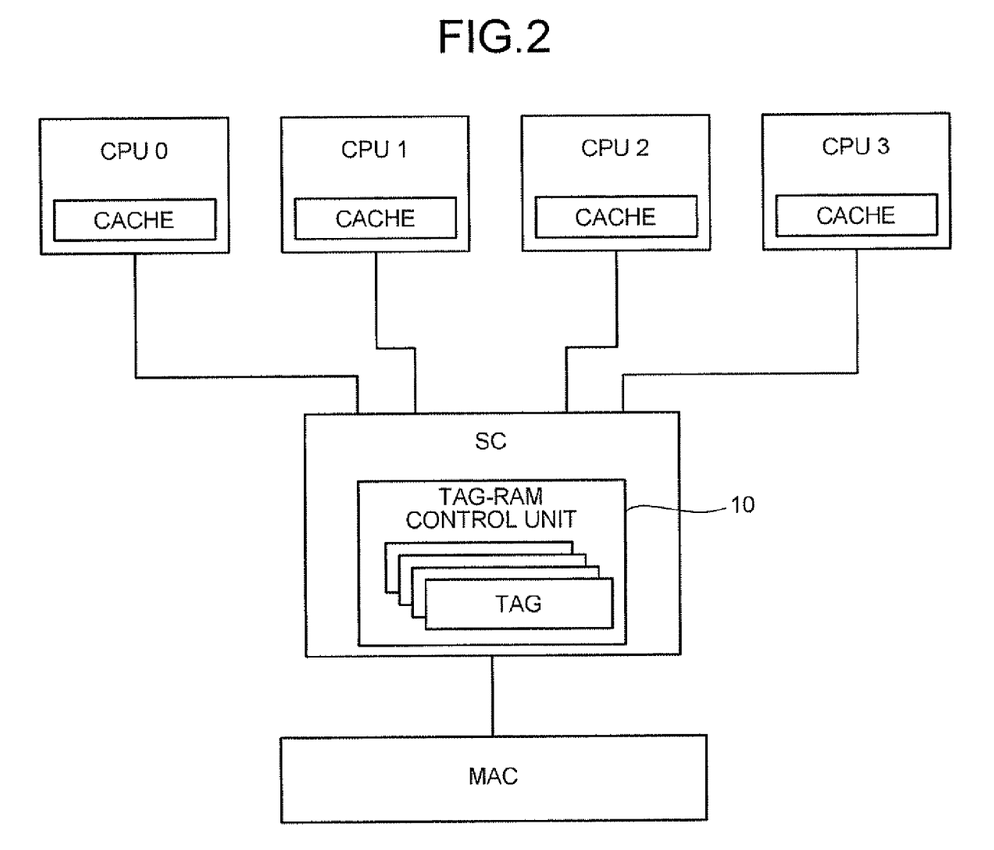
FIG. 2 is a schematic diagram of a tag-RAM control unit according to the present embodiment.

A relation between a tag-RAM control unit 10 according to the present embodiment and relevant devices is explained below with reference to FIG. 2. Although the tag-RAM control unit is in the SC in the present embodiment, the tag-RAM control unit can be configured as an independent cache controller. The cache control method according to the present embodiment can be used to control various cache memories without limited to the tag RAM.

The SC including the tag-RAM control unit 10 is connected to four CPUs 0 to 3. Each of the CPUs 0 to 3 includes a cache memory and a tag RAM that is used as the index of data stored in the cache memory. The tag-RAM control unit 10 stores therein a copy of tag RAM of each of the four CPUs.

For example, if the CPU 0 cannot find desired data in its cache memory, the CPU 0 determines whether the other CPUs (CPUs 1 to 3) include desired data by referring to the tag-RAM control unit 10. Upon determining that the other CPUs include the desired data, the CPU 0 retrieves the desired data from the CPU that includes the desired data. If the CPU 0 cannot find the desired data even after referring to the tag RAM in the tag-RAM control unit 10, the CPU 0 requests a memory access controller (MAC), to which the CPU 0 is connected via the SC, to send the desired data.

Figure 3:
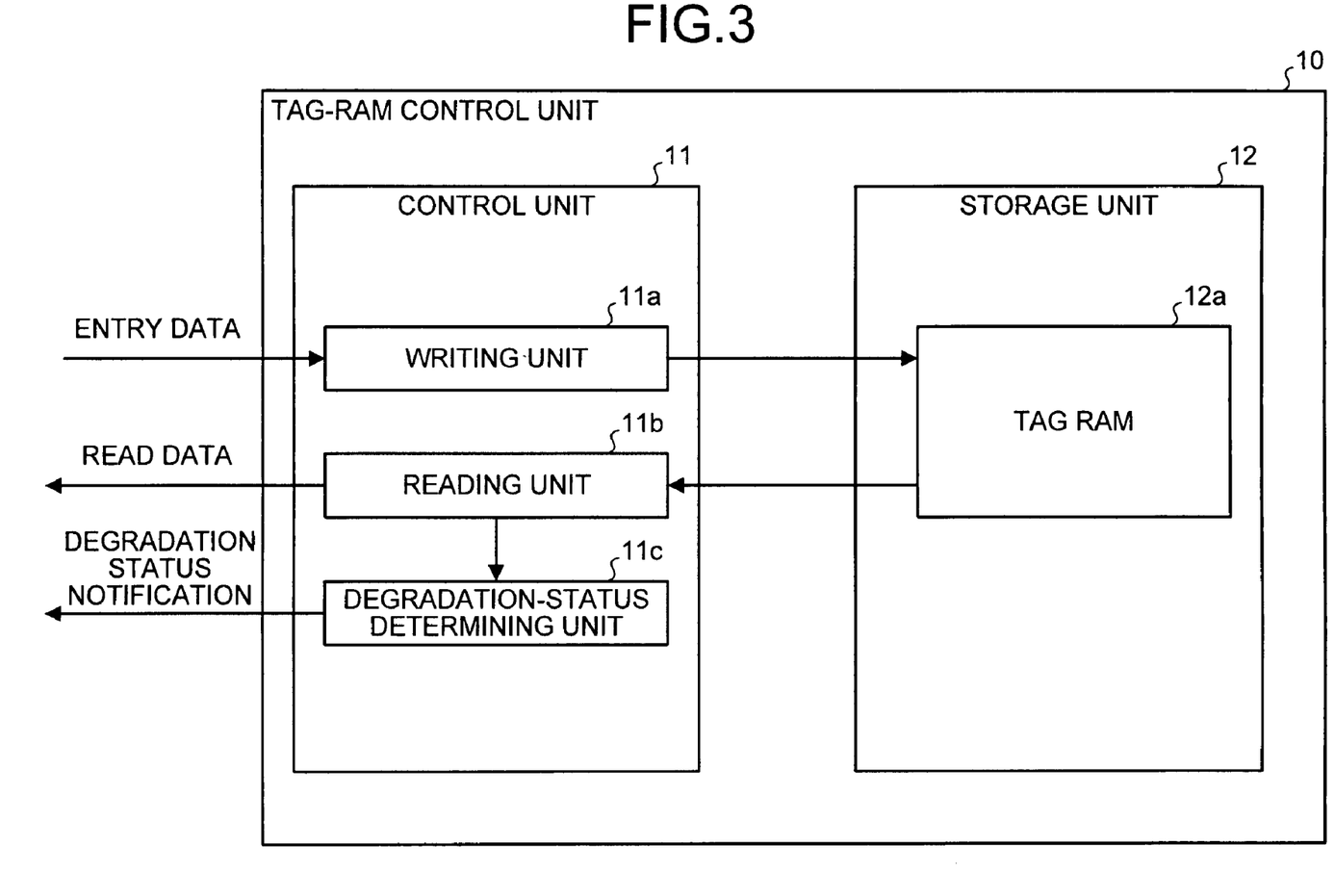
FIG. 3 is a block diagram of the tag-RAM control unit shown in FIG. 2.

The structure of the tag-RAM control unit 10 is explained with reference to FIG. 3. FIG. 3 is a block diagram of the tag-RAM control unit 10. The tag-RAM control unit 10 includes a control unit 11 and a storage unit 12. The control unit 11 includes a writing unit 11a, a reading unit 11b, and a degradation-status determining unit 11c. The storage unit 12 includes a tag RAM 12a corresponding to each CPU.

If a failed block is detected, the control unit 11 writes predetermined degradation data to the failed block of the tag RAM 12a. The control unit 11 reads data from a block of the tag RAM 12a, and determines whether the block is in the degradation state based on the obtained data.

Figure 4A:
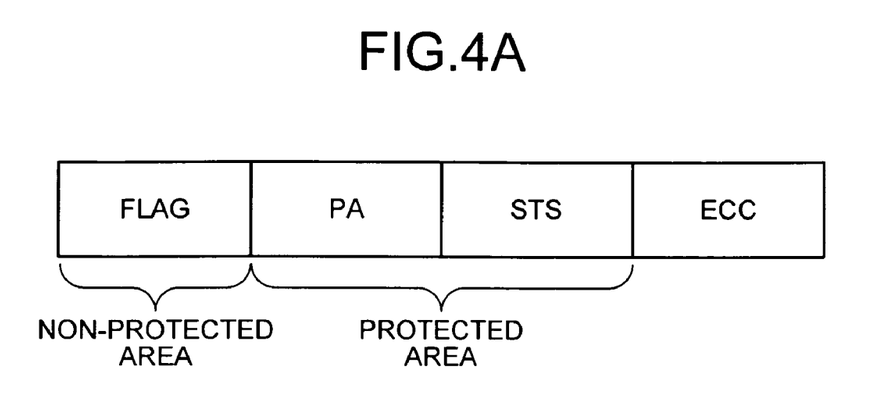
FIG. 4A is an example of the structure of entry data stored in a tag RAM shown in FIG. 3.

The writing unit 11a writes entry data received from the CPU to a block of the tag RAM 12a. If a failed block is detected, the writing unit 11a writes the degradation data to the failed block of the tag RAM 12a. The degradation data written by the writing unit 11a is explained with reference to FIGS. 4A and 4B. FIG. 4A is an example of the structure of entry data stored in the tag RAM 12a; and FIG. 4B is an example of the entry data in the degradation state.

As shown in FIG. 4A, the entry data in the tag RAM 12a includes a flag in the non-protected area, a physical address (PA) and a status (STS) in the protected area, and an ECC. The flag is 2-bit data. The flag of 11 indicates that the block is in the degradation state; the flag of 00 indicates that the block is not in the degradation state; and the flag of 01 or 10 indicates that the block is not in use. The physical address, which is 22-bit data, indicates an address of data.

The status, which is 8-bit data, indicates a status of data indicated by the tag in the CPU. The status of data includes four types: corresponding data is stored in one CPU, corresponding data is stored in a plurality of CPUs, corresponding data is stored in a plurality of CPUs and the data stored in the CPUs is new, and the corresponding data is not stored in any CPU. The ECC, which is 7-bit data, is used for protecting the physical address and the status.

Figure 4B:
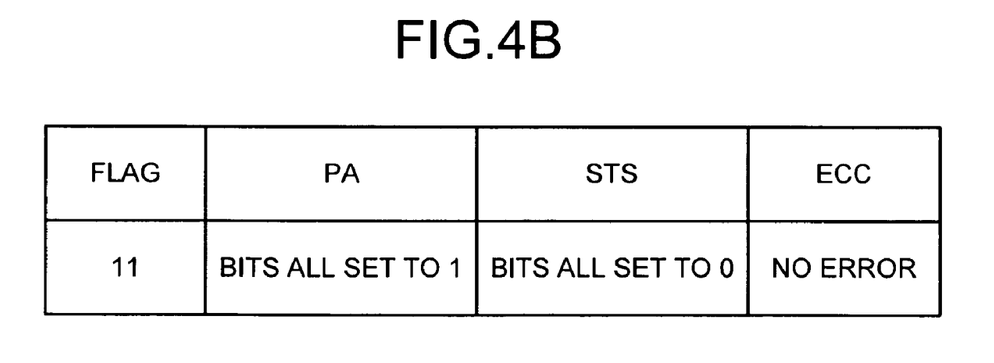
FIG. 4B is an example of the entry data in the degradation state.

If a failed block is detected, data shown in FIG. 4B is written to the failed block in the tag RAM 12a as the entry data. To be specific, "11" indicating that the block is in the degradation state, bits all set to 1 indicating that actual physical address does not exist, bits all set to 0 indicating that CPU does not stores therein valid data, and information indicative of no error are written as the flag, the physical address, the status, and the ECC, respectively.

In this manner, the degradation data, which indicates that the block is in the degradation state, is written to the failed block. However, data obtained by reading may differ from the originally written data due to a data error. Taking such data error into consideration, the degradation-status determining unit 11c determines whether the block is in the degradation state, thereby obtaining a correct result of determination.

The reading unit 11b is explained by referring back to FIG. 3. The reading unit 11b reads data from the tag RAM 12a, and sends the obtained data to the CPU. If the reading unit 11b reads data from the failed block, the reading unit 11b sends the obtained data to the degradation-status determining unit 11c.

Figure 5:
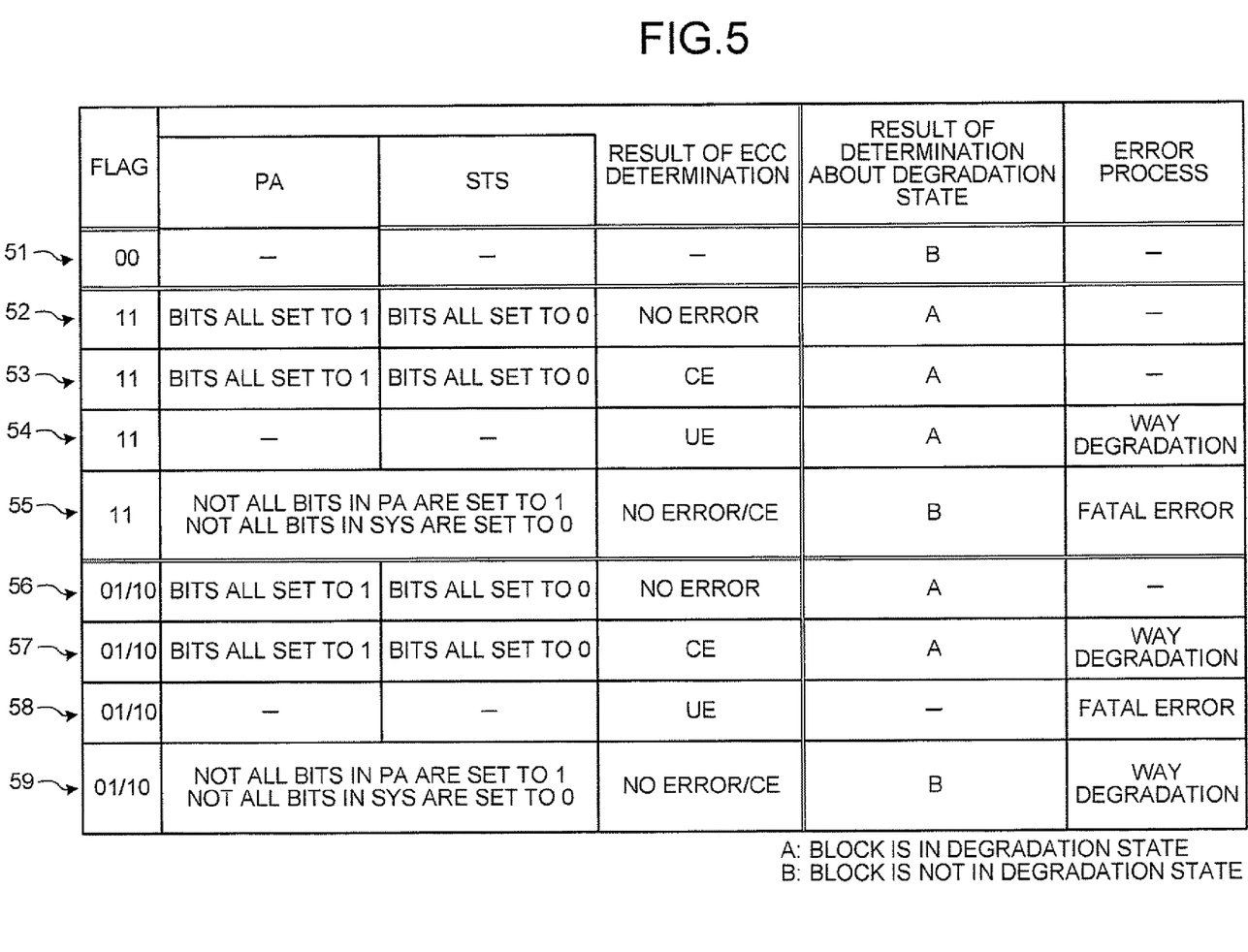
FIG. 5 is a table illustrating exemplary results of determination about the degradation state.

The degradation-status determining unit 11c determines whether the block is in the degradation state based on the data that is received from the reading unit 11b, and sends a result of determination to an external device. A determination process performed by the degradation-status determining unit 11c is explained in detail with reference to FIG. 5. FIG. 5 is a table for illustrating exemplary results of determination about the degradation state. CE shown in FIG. 5 indicates a correctable error; and UE indicates an uncorrectable error.

The degradation-status determining unit 11c determines whether the block is in the degradation state based on the flag stored in the non-protected area, the physical address and the status stored in the protected area, and a result of the ECC determination. The degradation-status determining unit 11c selects, if a given result of the determination about the degradation state is obtained, a required error process.

In a row 51 shown in FIG. 5, the flag is 00. As explained above, the flag of 00 indicates that the block is not in the degradation state, and the flag of 11 indicates that the block is in the degradation state. Because possibility that the original data written by the writing unit 11a had been 11, i.e., possibility that both bits are inverted due to data error is remarkably low, if the flag is 00, the degradation-status determining unit 11c determines that the block is not in the degradation state without checking the other fields.

In rows 52 to 55 shown in FIG. 5, the flag is 11. Upon receiving data shown in any one of rows 52 to 55, the degradation-status determining unit 11c determines whether the block is in the degradation state based on the physical address, the status, and the result of ECC determination in addition to the flag. If inadmissible data errors are included in the received data, for example, information indicated by one of the fields is inconsistent to information indicated by another field (see, the rows 54 and 55), the degradation-status determining unit 11c determining errors such as way degradation or a fatal error, and sends a result of determination about the degradation status to a relevant external device.

In rows 56 to 59 shown in FIG. 5, the flag is 01 or 10. Upon receiving data shown in any one of rows 56 to 59, the degradation-status determining unit 11c determines whether the block is in the degradation state based on the physical address, the status, and the result of ECC determination in addition to the flag. If inadmissible data errors are included in the received data, for example, information indicated by one of the fields is inconsistent to information indicated by another field (see, the rows 57, 58, and 59), the degradation-status determining unit 11c determining errors such as way degradation or a fatal error, and sends a result of determination about the degradation status to a relevant external device.

The storage unit 12 is explained by referring back to FIG. 3. The storage unit 12 includes the tag RAM 12a. The tag RAM 12a as a static RAM (SRAM) includes the ways and the blocks shown in FIG. 1. The tag RAM 12a includes tags as many as CPUs that refer to the tag-RAM control unit 10. The tags store therein a copy of the tag RAMs of the CPUs.

Figure 6:
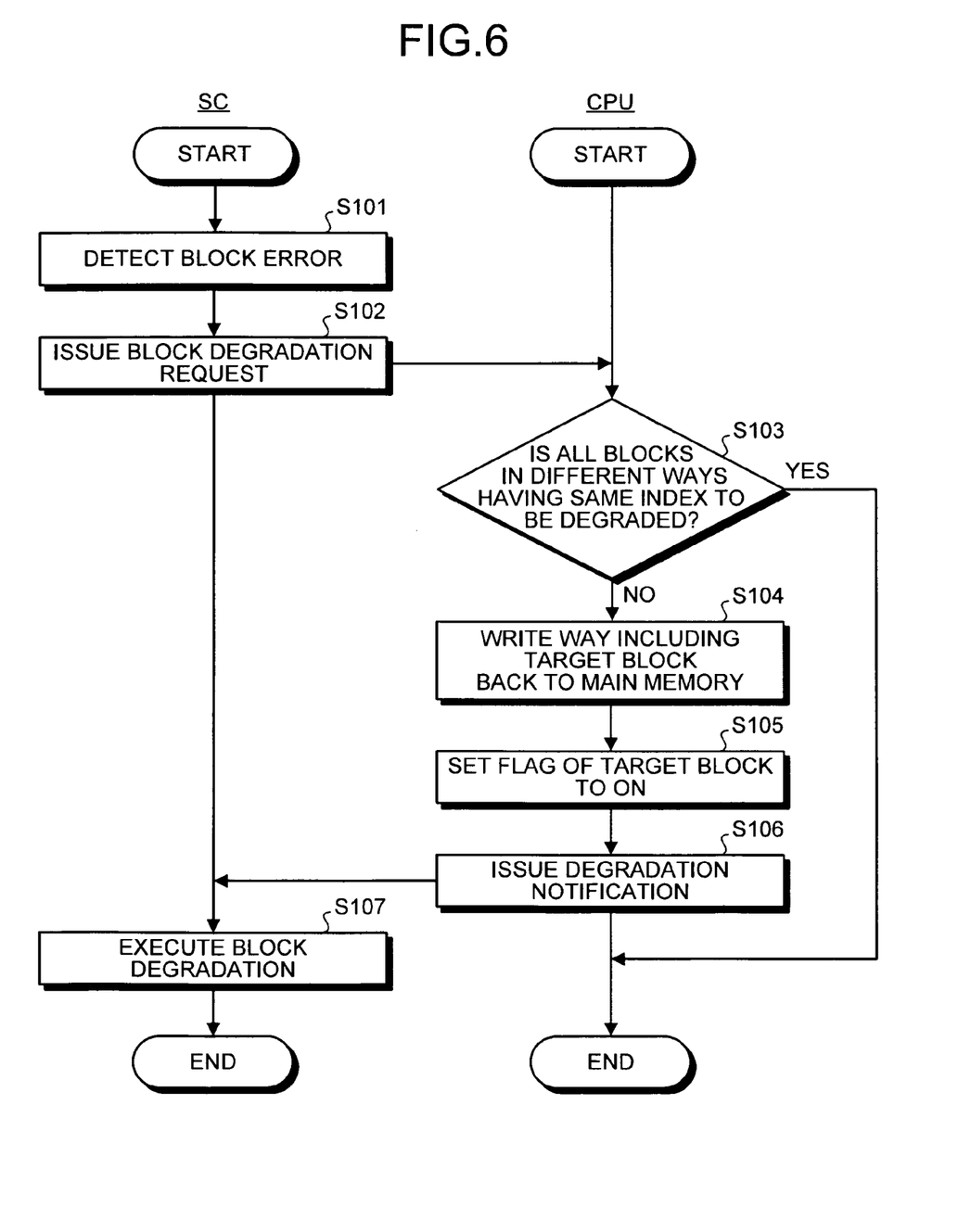
FIG. 6 is a flowchart of a block-degradation process.

FIG. 6 is a flowchart of a block-degradation process using the degradation data. Upon detecting a block error (Step S101), the SC issues a block-degradation request to the CPU (Step S102). Upon receiving the block-degradation request, the CPU determines whether if the target block is degraded, all blocks in different ways having the index same as the target block are degraded (Step S103).

If determining that all blocks in different ways having the index same as the target block are not to be degraded (No at Step S103), the CPU writes all data in the way including the target block back to the main memory (Step S104), and sets the flag of the target block to ON (see FIG. 4B, Step S105). After that, the CPU sends a degradation notification to the SC (Step S106). Upon receiving the degradation notification, the SC executes block degradation (Step S107), and the control process goes to end. On the other hand, if determining that all blocks in different ways having the index same as the target block are to be degraded (Yes at Step S103), the control process goes to end skipping Steps S104 to S106.

In the present embodiment, upon detecting the block failure, the writing unit writes degradation data indicating that the block is in the degradation state to both the protected area and the non-protected area as the entry data in the tag RAM. When the reading unit reads data from the block of the tag RAM, the degradation-status determining unit determines from the obtained data whether the block is in the degradation state taking possibility of occurrence of a read error into consideration. The degradation-status determining unit, if necessary, determines errors such as way degradation or the fatal error. In other words, a bit rate of the degradation data stored in the non-protected area is minimized by writing the degradation data to the protected area thereby using an error correcting function using the ECC. Thus, it is possible to degrade the failed block only with the lower amount of degradation data.

According to an embodiment of the present invention, it is possible to degrade the failed block only with a lower amount of degradation data.

Moreover, a size of the degradation data stored in a non-protected area is minimized.

Furthermore, it is unnecessary to reserve an area dedicated to the degradation data in a protected area.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A cache controller that controls a cache memory including a plurality of ways, each of the plurality of ways includes a plurality of blocks that stores therein entry data and each of the plurality of blocks includes a protected area protected by an error correction code and a non-protected area that is not protected by the error correction code, the cache controller comprising:
    a detecting unit that detects a failed block;
    a writing unit that writes a first data into the protected area of the failed block indicating the failed block is to be degraded and a second data into the non-protected area of the failed block indicating the failed block is to be degraded, when the failed block is detected by the detecting unit;
    a reading unit that reads an entry data from a block;
    a determining unit that determines whether the block from which the entry data is read by the reading unit is to be degraded based on whether the read entry includes the first data and the second data; and
    a degradation unit that degrades the failed block based on a determination result determined by the determining unit.

2. The cache controller according to claim 1, wherein the first data is not expected to be stored in the protected area when the block is in a normal state.

3. The cache controller according to claim 1, wherein the writing unit writes a 2-bit data as the second data.

4. The cache controller according to claim 1, wherein the determining unit determines whether any one of a block degradation process, a way degradation process, and a fatal error process is required.

5. A cache control method of controlling a cache memory including a plurality of ways, each of the plurality of ways includes a plurality of blocks that stores therein entry data and each of the plurality of blocks includes a protected area protected by an error correction code and a non-protected area that is not protected by the error correction code, the cache control method comprising:

detecting a failed block;

writing a first data into the protected area of the failed block indicating the failed block is to be degraded and a second data into the non-protected area of the failed block indicating the failed block is to be degraded, when the failed block is detected in the detecting;

reading an entry data from a block;

determining whether the block from which the entry data is read in the reading is to be degraded based on whether the read entry includes the first data and the second data; and     degrading the failed block based on a determination result determined in the determining.

6. The cache control method according to claim 5, wherein the first data is not expected to be stored in the protected area when the block is in a normal state.

7. The cache control method according to claim 5, wherein the writing includes writing a 2-bit data as the second data.

8. The cache control method according to claim 5, wherein the determining determines whether any one of a block degradation process, a way degradation process, and a fatal error process is required.

\* \* \* \* \*